(12) United States Patent
Kim et al.

(10) Patent No.: US 11,805,229 B2
(45) Date of Patent: Oct. 31, 2023

(54) VIDEO SEARCH INTERFACING APPARATUS FOR EFFECTIVELY SEARCHING FOR MULTIPLE RECORDED VIDEO CHANNELS

(71) Applicant: IDIS CO., LTD., Daejeon-si (KR)

(72) Inventors: Chul Kim, Seongnam-si (KR); GyeongMin Park, Seongnam-si (KR)

(73) Assignee: IDIS CO., LTD., Daejeon-si (KR)

( * ) Notice: Subject to any disclaimer, the term of this patent is extended or adjusted under 35 U.S.C. 154(b) by 0 days.

(21) Appl. No.: 17/306,987

(22) Filed: May 4, 2021

(65) Prior Publication Data
US 2022/0360743 A1    Nov. 10, 2022

(51) Int. Cl.
*H04N 7/18* (2006.01)
*G11B 27/34* (2006.01)
*H04N 9/87* (2006.01)
*H04N 5/77* (2006.01)

(52) U.S. Cl.
CPC ............. *H04N 7/181* (2013.01); *G11B 27/34* (2013.01); *H04N 5/77* (2013.01); *H04N 9/87* (2013.01)

(58) Field of Classification Search
CPC ............ H04N 7/181; H04N 5/77; H04N 9/87; H04N 13/0048; H04N 13/0055; G11B 27/34; G11B 27/105; G11B 2220/2541
USPC .......................................................... 386/223
See application file for complete search history.

(56) References Cited

U.S. PATENT DOCUMENTS

| | | | |
|---|---|---|---|
| 2003/0184647 A1* | 10/2003 | Yonezawa | H04N 5/232933 348/E7.086 |
| 2013/0091432 A1* | 4/2013 | Shet | G08B 13/19645 715/719 |
| 2014/0161417 A1* | 6/2014 | Kurupacheril | H04N 21/234336 386/241 |
| 2016/0034477 A1* | 2/2016 | Mao | H04N 7/181 386/353 |

FOREIGN PATENT DOCUMENTS

KR    10-2019-0092227 A    8/2019

* cited by examiner

*Primary Examiner* — Thai Q Tran
*Assistant Examiner* — Nienru Yang
(74) *Attorney, Agent, or Firm* — INSIGHT LAW GROUP, PLLC; Seung Lee (57) ABSTRACT

Provided is a video search interfacing apparatus for efficiently searching for a plurality of recorded video channels by generating a search history by selecting cameras in a time series manner according to a traffic line of an object of interest on a map on which physical positions of a plurality or cameras are visually arranged, thereby searching for a plurality of recorded video channels more intuitively.

17 Claims, 5 Drawing Sheets

VIDEO SEARCH INTERFACING APPARATUS FOR EFFECTIVELY SEARCHING FOR MULTIPLE RECORDED VIDEO CHANNELS

BACKGROUND

1. Field

The following description relates to a technique for effectively searching for recorded videos, and more particularly, to a video search interfacing apparatus for searching for a plurality of recorded video channels.

2. Description of Related Art

Surveillance cameras are installed and operated in a variety of places that require security. The number of surveillance cameras installed is growing rapidly each year, and the number of recorded video channels that users should search is also increasing rapidly. Therefore, techniques for efficiently searching for a plurality of recorded video channels become increasingly important.

When an incident such as a theft, a loss, or a crime occurs, recorded videos are searched for through a recorded-video playback function using a surveillance camera. In a user interface in which recorders and surveillance cameras are configured in a tree (or list) form, a camera device is identified by the name (or device number) thereof and thus a camera associated with an incident is not identified in an intuitive manner and a great deal of effort and time will be required to track a traffic line of an object of interest.

In order to use recorded videos as perfect evidence, recorded videos of all traffic lines of an object of interest should be checked and retrieved but a camera associated with the object of interest may not be easily identified or connected to in order to reproduce recorded videos or many man-hours will be spent due to an increase in the number of channels when playback points in time should be changed for each camera device each time.

Korean Patent Publication No. 10-2019-0092227 (Aug. 7, 2019) discloses a system for searching for a real video and a recorded video through an intelligent video analysis. In the above technique, closed circuit television (CCTV) videos are classified and stored in units of channels, and a predetermined video analysis condition is applied to CCTV videos of a plurality of CCTV cameras to analyze multi-channel videos simultaneously. Accordingly, a search condition set as an event may be searched for from captured CCTV videos to simultaneously search for multi-channels and prevent unnecessary manpower and time consumption.

Such recorded-video search techniques of the related art are techniques for searching for recorded videos on the basis of an event and thus are not intuitive. Accordingly, the inventor of the present application has conducted research into a technique for generating a search history by selecting cameras in a time series manner according to a traffic line of an object of interest on a map on which physical positions of a plurality of cameras are visually arranged, thereby searching for a plurality of recorded video channels more intuitively.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

The following description relates to providing a video search interfacing apparatus for generating a search history by selecting cameras in a time series manner according to a traffic line of an object of interest on a map on which physical positions of a plurality of cameras are visually arranged, thereby searching for a plurality of recorded video channels more intuitively.

In a general aspect, a video search interfacing apparatus for effectively searching for a plurality of recorded video channels includes: a map display configured to display, in a first region of a screen, a map on which physical positions of a plurality of cameras are visually arranged; a history manager configured to, when cameras are selected in a time series manner according to a traffic line of an object of interest on the map displayed in the first region of the screen so as to reproduce recorded videos, display and register a search history, including the selected cameras and playback points in time thereof, in a second region of the screen; a video reproducer configured to reproduce a recorded video, which is captured by a camera selected from the search history displayed and registered in the second region of the screen by the history manager to reproduce a video, starting from a playback point in time in a third region of the screen; and a controller configured to control overall device operations, including displaying a map by the map display, registering a search history by the history manager, and reproducing a recorded video by a video reproducer.

According to an additional embodiment of the present disclosure, the video search interfacing apparatus may further include a time point setter configured to display, in a fourth region of the screen, a time point setting interface for setting a point in time when a search history is to be registered.

According to an additional embodiment of the present disclosure, the video search interfacing apparatus may further include a bookmark manager configured to add a bookmark to an item selected to be bookmarked from the search history displayed in the second region of the screen by the history manager and display the added bookmark in a fifth region of the screen.

According to an additional embodiment of the present disclosure, the video search interfacing apparatus may further include a toolbar manager configured to display a playback control toolbar in a sixth region of the screen.

According to an additional embodiment of the present disclosure, the video search interfacing apparatus may further include a memory storing data of a map displayed by the map display, data of the recorded videos captured by the cameras arranged on the physical positions on the map, and data of the search history registered by the history manager.

According to an additional embodiment of the present disclosure, the video search interfacing apparatus may further include a communicator configured to receive data of a recorded video from each camera at positions in a network at which data of recorded videos captured and stored by the cameras arranged at the physical positions on the map is stored.

According to an additional embodiment of the present disclosure, the map on which the physical positions of the plurality of cameras are visually arranged may be a virtual map visually modeling the physical positions of the plurality of cameras.

According to an additional embodiment of the present disclosure, the map on which the physical positions of the plurality of cameras are visually arranged may be a representation of the plurality of cameras visually listed in the form of a node.

According to an additional embodiment of the present disclosure, the map on which the physical positions of the plurality of cameras are visually arranged may be an electronic map including global positioning system (GPS) coordinates or geographical information of the plurality of cameras.

According to an additional embodiment of the present disclosure, the history manager may be further configured to select at least one item among items of the search history displayed in the second region of the screen and register the selected item as an important item.

According to an additional embodiment of the present disclosure, the history manager may be further configured to register at least one item as an inactive item among items of the search history displayed in the second region of the screen.

According to an additional embodiment of the present disclosure, the bookmark manager may be further configured to change or delete the bookmarked item displayed in the fifth region of the screen.

Other features and aspects will be apparent from the following detailed description, the drawings, and the claims.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

Hereinafter, the present disclosure will be described in detail with respect to embodiments described herein with reference to the accompanying drawings so that those of skilled in the art may easily understand and implement the present disclosure. While certain embodiments are illustrated in the drawings and described in the detailed description, these embodiments are not intended to limit various embodiments of the present disclosure.

In the following description, well-known functions or constructions are not described in detail when it is determined that they would obscure the subject matter of the present disclosure due to unnecessary detail.

When a component is referred to as being "coupled to" or "connected" to another component, it should be understood that the component may be directly coupled to or connected to the other component but another component may be interposed therebetween.

In contrast, when a component is referred to as being "directly coupled to" or "directly connected" to another component, it should be understood that no component is interposed therebetween.

Figure 1:
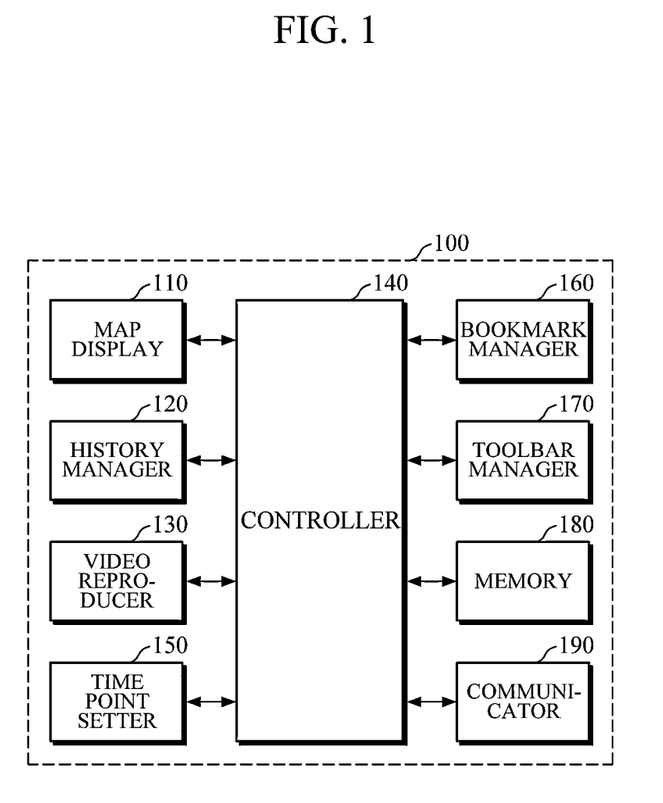
FIG. 1 is a block diagram illustrating a configuration of a video search interfacing apparatus for efficiently searching for a plurality of recorded video channels according to an embodiment of the present disclosure.
Figure 2:
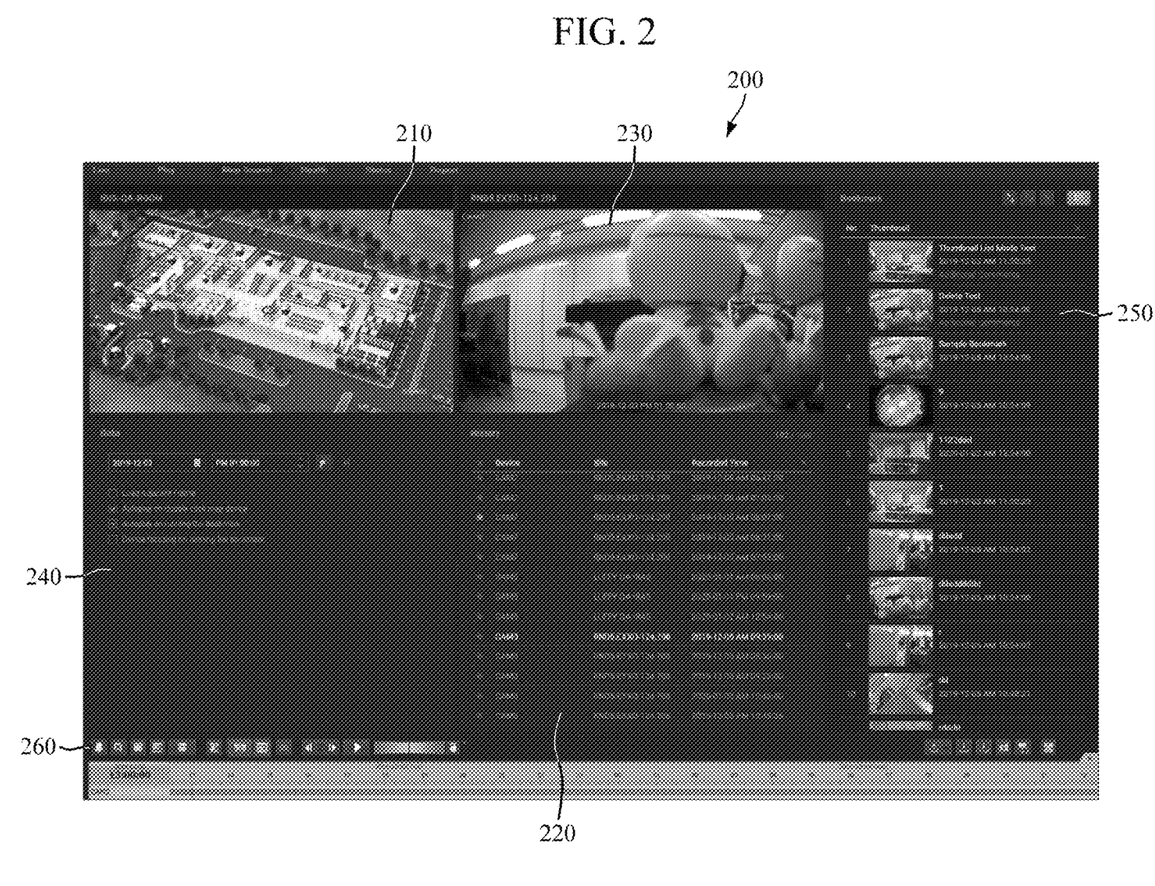
FIG. 2 is a diagram illustrating an example of an output screen of a video search interfacing apparatus for efficiently searching for a plurality of recorded video channels according to the present disclosure.

FIG. 1 is a block diagram illustrating an example of a configuration of a video search interfacing apparatus for efficiently searching for a plurality of recorded video channels according to an embodiment of the present disclosure. FIG. 2 is a diagram illustrating an example of an output screen of a video search interfacing apparatus for efficiently searching for a plurality of recorded video channels according to the present disclosure.

As shown in FIG. 1, a video search interfacing apparatus 100 capable of efficiently searching for a plurality of recorded video channels according to an embodiment includes a map display 110, a history manager 120, a video reproducer 130, and a controller 140.

The map display 110 displays a map, on which physical positions of a plurality of cameras are visually arranged, in a first region 210 of a screen 200. For example, the physical positions of the plurality of cameras may be sections divided on a map on which the plurality of cameras are located. In this case, the map display 110 may be embodied to additionally display map information including the name of the map on an upper end of the first region 210 of the screen 200.

The map on which the physical positions of the plurality of cameras are visually arranged may be a virtual map that visually models the physical positions of the plurality of cameras, a representation of the plurality of cameras in the form of nodes to visually list the plurality of cameras, or an electronic map including GPS coordinates or geographical information of the plurality of cameras.

Referring to FIG. 2, a map on which physical positions of a plurality of cameras are visually arranged is displayed in a first region 210, which is a left upper end portion, of a screen 200 output from a video search interfacing apparatus capable of effectively searching for a plurality of recorded video channels.

When cameras for reproducing recorded videos are selected in a time series manner according to a traffic line of an object of interest on the map displayed in the first region 210 of the screen 200 by the map display 110, the history manager 120 displays and registers a search history, including the selected cameras and playback points in time thereof, in a second region 220 of the screen 200.

For example, when a user double-clicks cameras in the time series manner on the map displayed in the first region 210 of the screen 200 by the map display 110 or drags the cameras and drops the cameras to the second region 220 of the screen 200 so as to select cameras to reproduce a recorded video, the history manager 120 may register a search history, including the selected cameras in the time series manner and playback time points thereof by displaying the search history in the second region 220 of the screen 200.

The history manager 120 may be configured to select at least one of items of the search history displayed in the second region 220 of the screen 200 and register the selected at least one item as an important item. For example, an asterisk may be marked in front of an important item among the items of the search history displayed in the second region 220 for management of the important item, and the important item may be selected or canceled through toggling of the asterisk.

The history manager 120 may be configured to register at least one of the items of the search history, which is displayed in the second region 220 of the screen 200, as an inactive item. For example, an item to be managed as an inactive item may be selected from among the items of the search history displayed in the second region 220 of the screen 200, and a right button of a mouse may be clicked to select an inactive item from a context menu to register the selected item in an inactive state, and thus, the selected item may be displayed blurred in the second region 220 of the screen 200.

Figure 3:
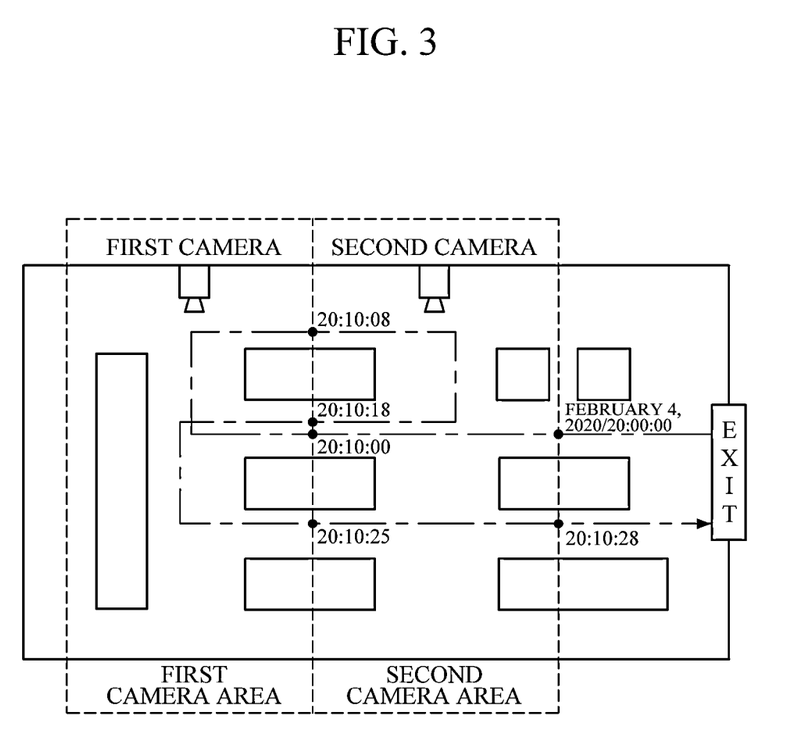
FIG. 3 is a diagram illustrating an example of a moving path of an object of interest on a map on which physical positions of a plurality of cameras are visually arranged.

FIG. 3 is a diagram illustrating an example of a moving path of an object of interest on a map on which physical positions of a plurality of cameras are visually arranged. In the example, the object of interest moved to a position of a second camera at 20:00:00 on Feb. 4, 2020, moved to a position of a first camera at 20:10:00, moved again to the position of the second camera at 20:10:08, moved again to the position of the first camera at 20:10:18, moved again to the position of the second camera at 20:10:25, and moved away from the position of the second camera at 20:10 28.

First, when the position of the second camera is selected through a user's manipulation, e.g., manipulating a mouse or touching a screen, on the map on which the physical positions of the plurality of cameras are visually arranged and playback time is set as 20:00:00 on Feb. 4, 2020, the history manager 120 displays and registers a search history, including the second camera and 20:00:00 on Feb. 4, 2020 as playback time, in the second region 220 of the screen 200. At the same time, a video captured and recorded by the second camera starting from 20:00:00 on Feb. 4, 2020 is reproduced by the video reproducer 130.

When it is determined that the object of interest moved to the position of the first camera at 20:10:00 during the reproduction of the video captured and recorded by the second camera starting from 20:00:00 on Feb. 4, 2020, the position of the first camera is selected by the user through user manipulation. Thereafter, the history manager 120 additionally displays and registers a search history, including the first camera and 20:10:00 on Feb. 4, 2020 as playback time, in the second region 220 of the screen 200. At the same time, a video captured and recorded by the first camera starting from 20:10:00 on Feb. 4, 2020 is reproduced by the video reproducer 130.

When it is determined that the object of interest moved to the position of the second camera at 20:10:08 during the reproduction of the video captured and recorded by the first camera starting from 20:10:00 on Feb. 4, 2020, the position of the second camera is selected by the user through user manipulation. Thereafter, the history manager 120 additionally displays and registers a search history, including the second camera and 20:10:08 on Feb. 4, 2020 as playback time, in the second region 220 of the screen 200. At the same time, a video captured and recorded by the second camera starting from 20:10:08 on Feb. 4, 2020 is reproduced by the video reproducer 130.

When it is determined that the object of interest moved to the position of the first camera at 20:10:18 during the reproduction of the video captured and recorded by the second camera starting from 20:10:08 on Feb. 4, 2020, the position of the first camera is selected by the user through user manipulation. Thereafter, the history manager 120 additionally displays and registers a search history, including the first camera and 20:10:18 on Feb. 4, 2020 as playback time, in the second region 220 of the screen 200. At the same time, a video captured and recorded by the first camera starting from 20:10:18 on Feb. 4, 2020 is reproduced by the video reproducer 130.

When it is determined that the object of interest moved to the position of the second camera at 20:10:25 during the reproduction of the video captured and recorded by the first camera starting from 20:10:18 on Feb. 4, 2020, the position of the second camera is selected by the user through user manipulation. Thereafter, the history manager 120 additionally displays and registers a search history, including the second camera and 20:10:25 on Feb. 4, 2020 as playback time, in the second region 220 of the screen 200. At the same time, a video captured and recorded by the second camera starting from 20:10:25 on Feb. 4, 2020 is reproduced by the video reproducer 130.

When it is determined that the object of interest moved away from the position of the second camera at 20:10:28 during the reproduction of the video captured and recorded by the second camera starting from 20:10:25 on Feb. 4, 2020, the reproduction of a video captured by the second camera is ended by the user through user manipulation. Through the above process, when cameras for reproducing recorded videos are time series selected according to a traffic line of the object of interest on the map displayed in the first region 210 of the screen 200 by the map display 110, the history manager 120 displays and registers a search history, including the time series selected cameras and playback times thereof, in a second region 220 of the screen 200.

The video reproducer 130 reproduces a recorded video captured by a camera selected from the search history, which is displayed and registered in the second region 220 of the screen 200 by the history manager 120, to reproduce a video starting from a playback point in time in a third region 230 of the screen 200.

That is, the video reproducer 130 reproduces a recorded video captured by a camera, which is selected during registration of a search history or selected from a list of registered search histories to reproduce a video, starting from a playback point in time in the third region 230 of the screen 200.

For example, the recorded video captured by the selected camera may be displayed in a full screen when a user double-clicks the third region 230 of the screen 200 and may be displayed in the third region 230 of the screen 200 when a user double-clicks the full screen.

The controller 140 controls overall device operations including displaying a map by the map display 110, registering a search history by the history manager 120, and reproducing a recorded video by the video reproducer 130.

A user may search for a number of recorded video channels more intuitively through a search history displayed and registered in the second region 220 of the screen 200 by the history manager 120 and reproduce and view a recorded video selected from the search history through the video reproducer 130.

Accordingly, according to the present disclosure, a search history may be generated by selecting cameras in the time series manner according to a traffic line of an object of interest on a map on which physical positions of cameras are visually arranged so as to allow a user to more intuitively search for a plurality of recorded video channels, thereby improving user convenience and search efficiency.

According to an additional embodiment of the present disclosure, the video search interfacing apparatus 100 capable of efficiently searching for a plurality of recorded video channels further includes a time point setter 150. The time point setter 150 displays a time point setting interface in a fourth region 240 of the screen 200 to set a point in time when a search history is to be registered.

Figure 4:
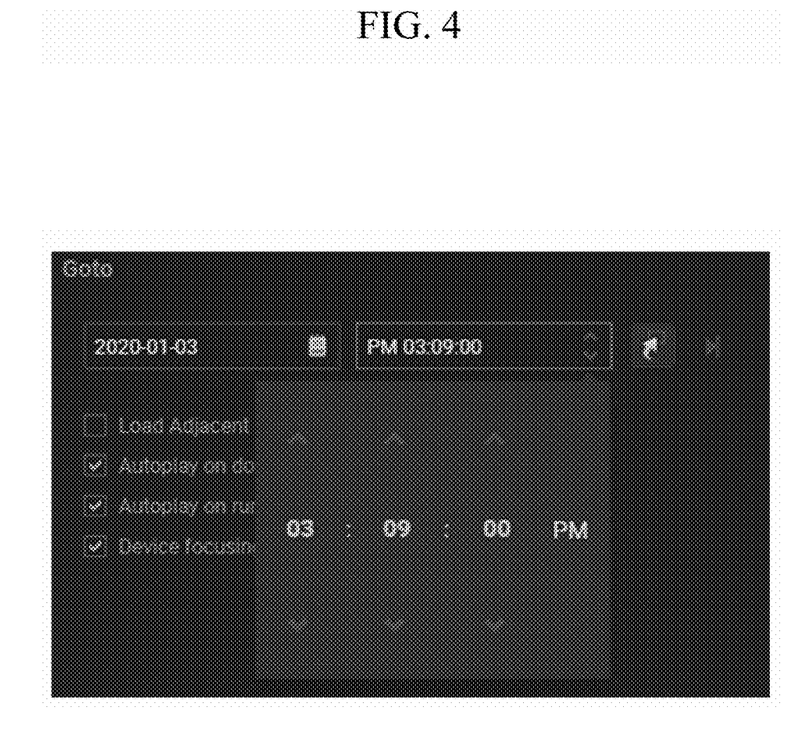
FIG. 4 is a diagram illustrating an example of a time point setting interface for setting a point in time at which search history registration is to be performed.

FIG. 4 is a diagram illustrating an example of a time point setting interface for setting a point in time at which search history registration is to be performed. When a point in time when a search history including a date and time is to be registered is set by the time point setter 150 through the point time setting interface displayed in the fourth region 240 of the screen 200 as illustrated in FIG. 4, a point in time when a recorded video displayed in the third region 230 of the screen 200 is to be reproduced by the video reproducer 130 is moved to a point in time set by the time point setter 150 and a process of registering the search history starts, starting from the moved point in time.

In this case, the point in time when the search history including the date and time is to be registered may be input through selection by mouse wheel scrolling, a keyboard input, a time-input widget or the like, and when there is no recorded video captured at the set point in time, a video frame captured at a point in time closest to the set point in time may be loaded.

According to an additional embodiment of the present disclosure, the video search interfacing apparatus 100 capable of efficiently searching for a plurality of recorded video channels may further include a bookmark manager 160. The bookmark manager 160 adds a bookmark to an item selected to be bookmarked from the search history displayed in the second region 220 of the screen 200 by the history manager 120 and displays the bookmark of the item in a fifth region 250 of the screen 200.

In this case, the bookmark manager 160 may be configured to display bookmarks added in the fifth region 250 of the screen 200 in a thumbnail view. An order in which the bookmarks are displayed in the thumbnail view may be freely changed through user manipulation such as a drag-and-drop operation.

For example, when an item selected from the search history displayed in the second region 220 of the screen 200 is dragged and dropped to the fifth region 250 of the screen 200, the bookmark manager 160 may add a bookmark to the dragged and dropped item and display the added bookmark in the fifth region 250 of the screen 200.

For example, when an item is selected from the search history displayed in the second region 220 of the screen 200, a mouse is clicked to activate a context menu, and an 'add bookmark' item in the activated context menu is clicked, the bookmark manager 160 may add a bookmark to the selected item and display the added bookmark in the fifth region 250 of the screen 200.

The bookmark manager 160 may be configured to change or delete a bookmark item displayed in the fifth region 250 of the screen 200. For example, when the bookmark item displayed in the fifth region 250 of the screen 200 is selected, the context menu is activated by clicking a mouse, and a 'change or delete bookmark' item in the activated context menu is clicked, the bookmark manager 160 may change or delete the selected bookmark item.

Alternatively, the bookmark manager 160 may be configured to execute the bookmark item displayed in the fifth region 250 of the screen 200. For example, the bookmark manager 160 may be configured to reproduce a recorded video, which corresponds to an item of the search history corresponding to a bookmark displayed in the fifth region 250 of the screen 200, in the third region 230 of the screen 200 through user manipulation, e.g., double-clicking the bookmark.

Alternatively, the bookmark manager 160 may be configured to perform file exporting on bookmark items displayed in the fifth region 250 of the screen 200. For example, the bookmark manager 160 may be configured to export bookmark items, which are displayed in the fifth region 250 of the screen 200, in the form of an excel file. In this case, the exported excel file may include a thumbnail snapshot image, a playback point in time, location information of a recorded video, and the like.

According to an additional embodiment of the present disclosure, the video search interfacing apparatus 100 capable of efficiently searching for a plurality of recorded video channels may further include a toolbar manager 170. The toolbar manager 170 displays a play control toolbar in a sixth region 260 of the screen 200.

Figure 5:
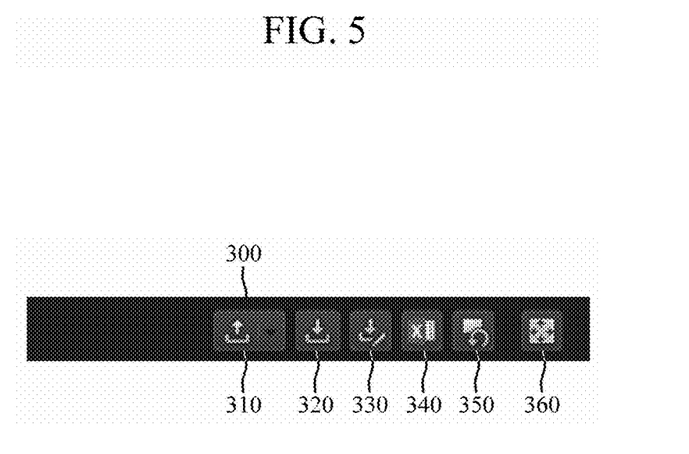
FIG. 5 is a diagram illustrating an example of a play control toolbar.

FIG. 5 is a diagram illustrating an example of a play control toolbar. As shown in FIG. 5, a play control toolbar 300 displayed in the sixth region 260 of the screen 200 by the toolbar manager 170 may include an 'open file' button 310, a 'save file' button 320, a 'save as' button 330, a 'save bookmark excel file' button 340, a 'close' button 350, and a 'full screen' button 360.

Search history data is imported when the 'open file' button 310 is clicked. The search history data is saved when the 'save file' button 320 is clicked. The search history data is saved in a different name when the 'save as' button 330 is clicked. Bookmark items are saved in an excel file when the 'save bookmark excel file' button 340 is clicked. The imported search history data is closed and displaying of a map by a map display and a video play session by a video reproducer are ended when the 'close' button 350 is clicked. A video reproduced in a third region of a screen is reproduced in a full screen when the 'full screen' button 360 is clicked.

According to an additional embodiment of the present disclosure, the video search interfacing apparatus 100 capable of efficiently searching for a plurality of recorded video channels may further include a memory 180. The memory 180 stores data of a map displayed by the map display 110, data of recorded videos captured by cameras arranged on physical positions on the map, and data of a search history registered by the history manager 120.

According to an additional embodiment of the present disclosure, the video search interfacing apparatus 100 capable of efficiently searching for a plurality of recorded video channels may further include a communicator 190. The communicator 190 receives pieces of data of recorded videos, which are captured and stored by the cameras arranged on the physical positions on the map, at positions in a network at which the pieces of data of the recorded videos are stored and stores the pieces of data in the memory 180.

For example, the communicator 190 may be configured to receive the data of the recorded video of each of the cameras in an Ethernet-based wired network method or a wireless network method such as Wi-Fi, Bluetooth Low Energy (BLE), Long Term Evolution (LTE), and so on.

As described above, according to the present disclosure, an object of interest may be specified while a recorded video is reproduced using a recorded video play function, and a search history may be registered while effectively tracking a behavior and traffic line of the object of interest by selecting a camera in a moving direction of the object of interest on a map while the recorded video is reproduced.

Accordingly, according to the present disclosure, a search history may be generated by selecting cameras in the time series manner according to a traffic line of an object of interest on a map on which physical positions of cameras are visually arranged so as to allow a user to more intuitively search for a plurality of recorded video channels, thereby improving user convenience and search efficiency.

The various embodiments set forth in the present specification and the drawings are only examples provided to help understanding of the present disclosure and are not intended to limit the scope of various embodiments of the present disclosure.

Therefore, the scope of various embodiments of the present disclosure should be understood to include not only the embodiments described above but also all modifications or changes derivable on the basis of the technical ideas of various embodiments of the present disclosure.

What is claimed is:

1. A video search interfacing apparatus for effectively searching for a plurality of recorded video channels, comprising:
a map display configured to display, in a first region of a screen, a map on which physical positions of a plurality of cameras are visually arranged;
a history manager configured to display a search history in a second region of the screen, wherein the search history comprises a plurality of items each comprising an identifier of a camera and a playback time point of the camera, wherein the history manager is further configured to, upon selection of a camera by a user on the map displayed in the first region of the screen, update the search history to additionally include an item comprising an identifier of the selected camera and the playback point in time thereof to the plurality of items and display the updated search history in the second region of the screen;
a video reproducer configured to reproduce a recorded video, which is captured by a camera selected from the search history displayed and registered in the second region of the screen by the history manager to reproduce a video, starting from a playback point in time in a third region of the screen; and
a controller configured to control overall device operations, including displaying a map by the map display, registering a search history by the history manager, and reproducing a recorded video by a video reproducer.

2. The video search interfacing apparatus of claim 1, further comprising a time point setter configured to display, in a fourth region of the screen, a time point setting interface for setting a point in time when a search history is to be registered.

3. The video search interfacing apparatus of claim 1, further comprising a bookmark manager configured to add a bookmark to an item selected to be bookmarked from the search history displayed in the second region of the screen by the history manager and display the added bookmark in a fifth region of the screen.

4. The video search interfacing apparatus of claim 3, wherein the bookmark manager is further configured to change or delete the bookmarked item displayed in the fifth region of the screen.

5. The video search interfacing apparatus of claim 1, further comprising a toolbar manager configured to display a playback control toolbar in a sixth region of the screen.

6. The video search interfacing apparatus of claim 1, further comprising a memory storing data of a map displayed by the map display, data of the recorded videos captured by the cameras arranged on the physical positions on the map, and data of the search history registered by the history manager.

7. The video search interfacing apparatus of claim 6, further comprising a communicator configured to receive data of a recorded video from each camera at positions in a network at which data of recorded videos captured and stored by the cameras arranged at the physical positions on the map is stored.

8. The video search interfacing apparatus of claim 1, wherein the map on which the physical positions of the plurality of cameras are visually arranged comprises a virtual map visually modeling the physical positions of the plurality of cameras.

9. The video search interfacing apparatus of claim 1, wherein the map on which the physical positions of the plurality of cameras are visually arranged comprises a representation of the plurality of cameras visually listed in the form of a node.

10. The video search interfacing apparatus of claim 1, wherein the map on which the physical positions of the plurality of cameras are visually arranged comprises an electronic map including global positioning system (GPS) coordinates or geographical information of the plurality of cameras.

11. The video search interfacing apparatus of claim 1, wherein the history manager is further configured to select at least one item among items of the search history displayed in the second region of the screen and register the selected item as an important item.

12. The video search interfacing apparatus of claim 1, wherein the history manager is further configured to register at least one item as an inactive item among items of the search history displayed in the second region of the screen.

13. The video search interfacing apparatus of claim 1, wherein each of the cameras are selected by the user through the user's selection of the cameras in the first region of the screen.

14. The video search interfacing apparatus of claim 1, wherein each of the cameras are selected by the user by double clicking the respective camera in the first region.

15. The video search interfacing apparatus of claim 1, wherein each of the cameras are selected by the user by dragging the respective camera in the first region and dropping the respective camera to the second region.

16. The video search interfacing apparatus of claim 1, wherein the cameras in the first region are selected by the user manually.

17. The video search interfacing apparatus of claim 1, wherein at least two items of the plurality of items have an identical identifier of a camera but different playback time points of the camera.

* * * * *